Dec. 20, 1966 K. R. MacKENZIE 3,293,490
APPARATUS FOR OBTAINING CONTROLLED
PRODUCTION OF CHARGED PARTICLES
Filed July 25, 1961 2 Sheets-Sheet 1

INVENTOR:
Kenneth R. MacKenzie

Attorneys

Dec. 20, 1966  K. R. MacKENZIE  3,293,490
APPARATUS FOR OBTAINING CONTROLLED
PRODUCTION OF CHARGED PARTICLES
Filed July 25, 1961  2 Sheets-Sheet 2
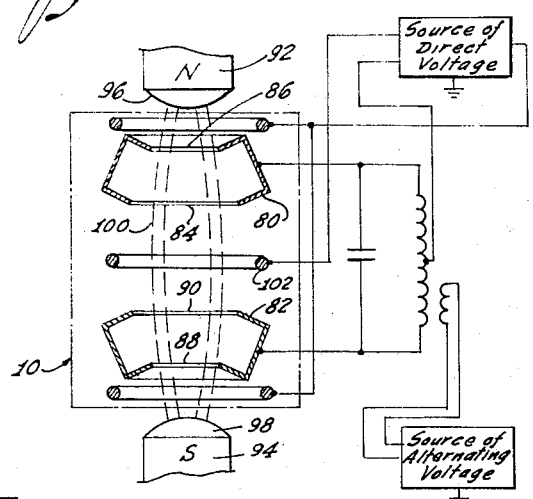
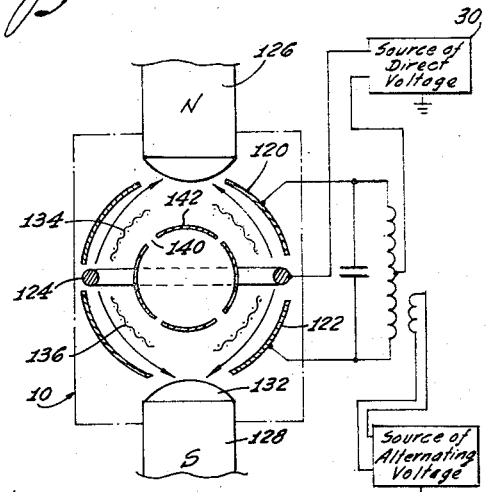
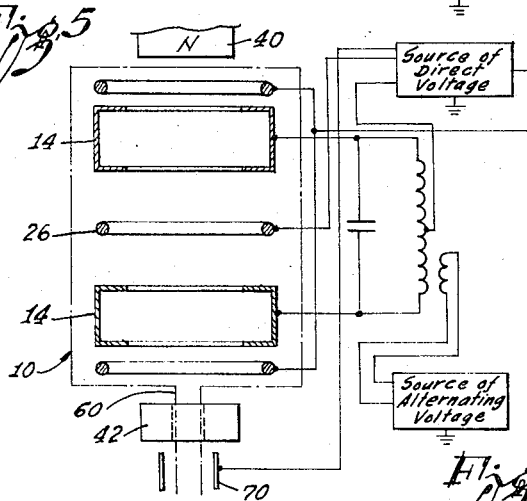
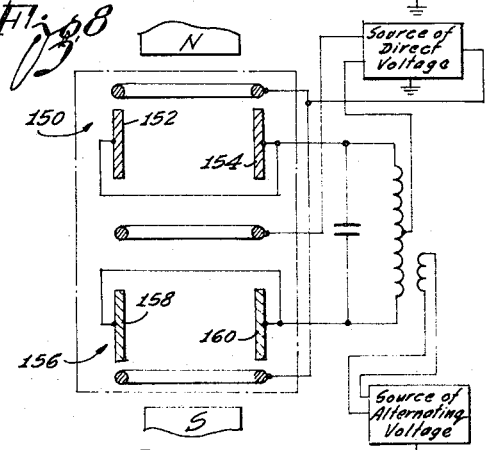
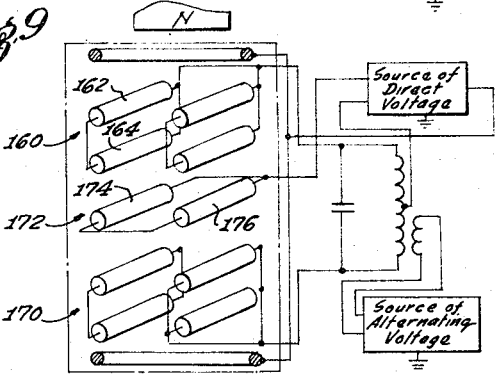
INVENTOR:
Kenneth R. MacKenzie
Smyth, Roston & Pavitt
Attorneys

United States Patent Office 3,293,490
Patented Dec. 20, 1966

3,293,490
APPARATUS FOR OBTAINING CONTROLLED
PRODUCTION OF CHARGED PARTICLES
Kenneth R. MacKenzie, Pacific Palisades, Calif., assignor, by mesne assignments, to Robert A. Cornog, Woodland Hills, Calif.
Filed July 25, 1961, Ser. No. 126,554
22 Claims. (Cl. 315—111)

This invention relates to apparatus for obtaining a controlled production of charged particles. More particularly, the invention relates to apparatus for obtaining the controlled production of the charged particles in a manner to determine the relative number of molecules in an enclosure. The invention is also concerned with apparatus for obtaining the production of charged particles from the molecules in an enclosure and for removing the charged particles to produce a vacuum in the enclosure. The invention also relates to apparatus which constitutes a source of ions.

As scientific apparatus becomes increasingly complex, the use of vacuum techniques becomes increasingly prevalent to obtain enhanced accuracies and sensitivities in measurements. When such vacuum techniques are used, it is important to determine the number of molecules in an enclosure and to determine the characteristics of the molecules in the enclosure. For example, it is often important to determine the number of molecules in an enclosure so as to determine whether a vacuum has been adequately produced within the enclosure. It is also important to test for the relative number of molecules in an enclosure to determine whether leakage is occurring into the enclosure or out of the enclosure.

Various types of equipment have been used to test for molecules in an enclosure. One type of equipment now in use produces electrons from the molecules in an enclosure and tests to determine the number of electrons produced in a particular period of time. This particular type of equipment is disadvantageous because it produces some electrons from the molecules in the enclosure and other electrons from the walls defining the enclosure. Since some of the electrons are produced from the walls defining the enclosure and since their rate of production depends upon wall conditions such as the occurence of dirt and oxides on the walls, these electrons vary the output indications obtained so that accurate results are difficult to obtain or to interpret.

The equipment now in use uses only a single electrode. This electrode is connected to receive a relatively high voltage in the order of 2,000 volts. Because of the high voltage between the electrode and the walls defining the enclosure, sparking sometimes occurs between the electrode and the enclosure walls. The sparking produces surface charges which increase the difficulties of obtaining accurate measurements as to the number of charged particles produced from the molecules in the enclosure.

This invention provides an ionization gauge which overcomes the above disadvantages. The ionization gauge constituting this invention uses relatively low voltages, such as voltages in the order of 200 volts. Furthermore, the ionization gauge constituting this invention is constructed to produce charged particles only from the molecules in the enclosure and not from the walls of the enclosure. The ionization gauge constituting this invention is further advantageous because it uses the charged particles within the enclosure efficiently to produce an optimum number of further charged particles from the molecules in the enclosure.

In the ionization gauge constituting this invention, a pair of electrodes are disposed in spaced relationship to each other within an enclosure. Each of the electrodes is shaped to define a space within which charged particles such as electrons are partially retained. Each of the electrodes is provided with an opening which is disposed relative to the opening in the other electrode so that charged particles such as electrons are able to move in a reciprocal path between the electrodes. Alternating voltages are applied to the electrodes in an opposing phase relationship. This relationship is such that the voltage on one electrode is increasing in each alternating half cycle while the voltage on the second electrode is decreasing in that half cycle. In the other half cycles, the voltage on the second electrode is increasing while the voltage on the first electrode is decreasing.

Because of the introduction of the alternating voltage to the electrodes in an opposing phase relationship, the electrons retained within each electrode in each half cycle become directed to the other electrode in that half cycle. As the electrons travel through the space between the electrodes, they strike molecules within the enclosure and produce further charged particles. In this way, the number of electrons becomes multiplied in accordance with the number of molecules within the enclosure.

Means are provided in the ionization gauges constituting this invention for channeling the flow of electrons in the reciprocal path so that most of the electrons are prevented from striking the electrodes or the walls defining the enclosure. This is important in insuring that electrons are produced only from the molecules within the enclosure and not from any of the electrodes or the walls defining the enclosure. The channeled movement of the electrons may be obtained by producing a magnetic field in a direction corresponding to the path of reciprocal movement of the electrons.

In certain of the embodiments of the ionization gauge included within this invention, means are provided for removing some of the charged particles produced within the enclosure. The charged particles may be removed in a direction corresponding to the reciprocal path of movement of the ions or in a direction transverse to such reciprocal path.

When charged particles are removed from the enclosure, the ionization gauges included in this invention may constitute a source of charged particles such as an ion source. The removal of the charged particles from the enclosure without any further introduction of molecules into the enclosure also causes the ionization gauges constituting this invention to operate as a vacuum pump. The ionization gauges operate as a vacuum pump under such circumstances since the number of molecules in the enclosure gradually becomes exhausted.

In the drawings:

FIGURE 5 is a view, partly in section and partly in block form, schematically illustrating a fourth embodiment of the ionization gauge included in this invention;

FIGURE 6 is a view, partly in section and partly in block form, schematically illustrating a fifth embodiment of the ionization gauge included in this invention;

FIGURE 7 is a view, partly in section and partly in block form, schematically illustrating a sixth embodiment of the ionization gauge included in this invention;

FIGURE 8 is a view, partly in section and partly in block form, schematically illustrating a seventh embodiment of the ionization gauge included in this invention; and FIGURE 9 is a view, partly in perspective and partly in block form, schematically illustrating an eighth embodiment of the ionization gauge included in this invention.

Figure 1:
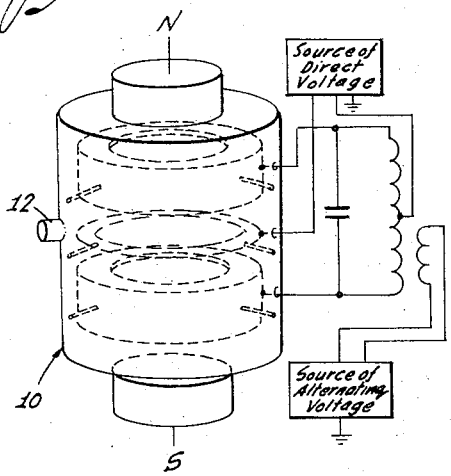
FIGURE 1 is a view, partially in perspective and partially in block form, schematically illustrating one embodiment of an ionization gauge included in this invention.
Figure 2:
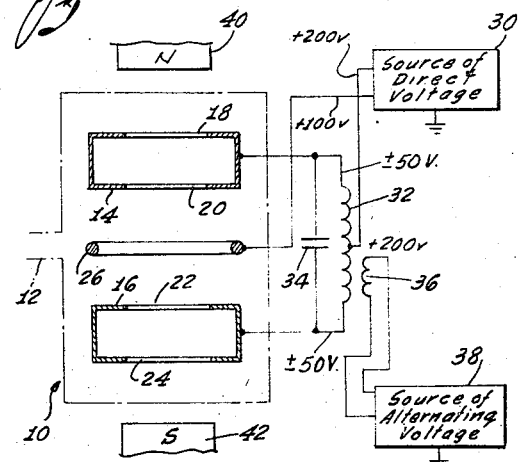
FIGURE 2 is a view, partially in section and partially in block form, schematically illustrating the embodiment of the ionization gauge shown in FIGURE 1.

In the ionization gauge illustrated in FIGURES 1 and 2, an enclosure 10 is schematically illustrated as being provided with a cylindrical configuration. The enclosure 10 may be made from a suitable electrical conductor having non-magnetic properties, brass being a good example. The enclosure 10 is connected to a suitable reference potential such as ground. The enclosure 10 is provided with a conduit 12 to receive molecules from a source (not shown). The molecules may be obtained from any gaseous element, compound or group of elements and compounds disposed in the source (not shown).

A pair of electrodes 14 and 16 are disposed in spaced relationship within the enclosure 10. Each of the electrodes 14 and 16 may be made from a suitable electrical conductor, such as brass or stainless steel, which has non-magnetic properties. Each of the electrodes 14 and 16 may be provided with a cylindrical configuration to retain charged particles such as electrons within the cylindrical configuration of the electrode.

The electrode 14 is provided with openings 18 and 20 at opposite faces of the cylindrical configuration defining the electrode. In like manner, the electrode 16 is provided with openings 22 and 24 at the opposite faces of the cylindrical configuration defining the electrode. The electrodes 14 and 16 are disposed in axially aligned relationship with the opening 18 in the electrode 14 facing the opening 24 in the electrode 16. The electrodes 14 and 16 are disposed at opposite ends of the enclosure 10 so that the openings 18 and 24 are spaced some distance from each other. By way of illustration, each of the electrodes may have an axial length of approximately ½" and may have a spacing of approximately ½" from the other electrode. The electrodes 14 and 16 may have diameters of approximately 1½" and the openings 18, 20, 22 and 24 may have diameters of approximately ¾".

A grid 26 having a hollow annular shape is disposed between the electrodes 14 and 16, preferably in equidistant relationship to the electrodes. The grid 26 is further disposed in axial alignment with the electrodes 14 and 16. The grid 26 is made from an electrical conductor having non-magnetic properties, brass or stainless steel being good examples.

A pair of poles 40 and 42 are disposed at opposite ends of the enclosure 10 in external relationship to the enclosure. The pole 40 may be a north pole and the pole 42 may be a south pole. The poles 40 and 42 are disposed along the axial line common to the enclosure 10, the electrodes 14 and 16 and the grid 26. By way of illustration, the poles 40 and 42 may provide magnetic fields in the order of 100 to 1000 gauss. Although the poles 40 and 42 preferably are included in a permanent magnet, it will be appreciated that the pole may also be obtained from an electromagnet in which a winding is continually energized to produce the desired pattern of flux.

The electrodes 14 and 16 are coupled electrically to a source 30 of direct voltage to receive potentials such as +200 volts from the source. This electrical coupling may occur through the center top of a winding 32. The ring 26 is also connected to the source 30 to receive a direct voltage such as in the order of +100 volts from the source.

A tuned circuit such as that formed from a parallel combination of the winding 32 and a capacitance 34 is connected between the electrodes 14 and 16. The tuned circuit formed by the winding 32 and the capacitance 34 receives alternating signals as by mutual coupling between the winding 32 and a winding 36 which is connected to a source 38 of alternating voltage. The source 38 is constructed to provide alternating signals at a suitable frequency such as in the order of 2 megacycles per second. By way of illustration, the alternating signals from the source 38 may have a peak amplitude in the order of 50 volts, although peak amplitudes as low as 20 volts or as high as 100 volts or higher have also been found to be satisfactory.

Since electrons normally exist in the atmosphere, they also exist in the enclosure 10. These electrons are controlled in disposition and movement by the sources 30 and 38. Since each of the electrodes 14 and 16 is provided with a cylindrical configuration having a uniform voltage, the electrons are retained within each of the electrodes. Any electrons external to the electrodes 14 and 16 tend to be attracted to the space within the electrodes because of the positive potentials applied to the electrodes from the source 30. These electrons oscillate back and forth in an axial direction through the space within the electrodes 14 and 16 because of the axial confining action on the electrons of the magnet formed by the poles 40 and 42.

When an alternating voltage is applied to the electrodes 14 and 16 from the source 38, a potential gradient is produced between the electrodes. For example, in one-half cycle, the alternating potential from the source 38 may cause the voltage on the electrode 16 to increase above the direct potential of +200 volts and the voltage on the electrode 14 to decrease below the direct potential of +200 volts. This causes the electrons within the electrode 14 to be attracted toward the electrode 16. These electrons move through the space between the electrodes 14 and 16. After the electrons have entered the electrode 16, they strike molecules of the gas within the electrode 16 with a sufficient force to ionize the molecules into electrons and positive ions. This occurs during the movement of the electrons into the region within the electrode 16 and during subsequent oscillatory movements of the electrons within the electrode 16 before the movement of the electrons from the electrode 16 to the electrode 14.

In the next half-cycle of the alternating voltage, the potential on the electrode 14 increases and the potential on the electrode 16 decreases. This causes the electrons produced and retained within the electrode 16 to be attracted toward the electrode 14. Upon the movement of the electrons into space defined by the electrode, the electrons strike molecules of the gas within the electrode with a sufficient force to produce further electrons and positive ions. The electrons also produce further charged particles during the oscillatory movement of the electrons after their movement into the region within the electrode 14 and before their return to the electrode 16. The oscillatory movement of the electrons is produced because of the positive voltage on the electrode 14.

In this way, the number of electrons becomes increased in successive half-cycles of the alternating voltage from the source 38. As the number of electrons becomes increased, their opportunities to strike molecules and ionize the molecules become correspondingly increased. Because of this, a considerable number of electrons and positive ions are produced relatively quickly from the molecules of the gas within the enclosure 10. The electrons and positive ions may be used in a number of ways that will become apparent from the subsequent discussion. For example, the number of electrons or positive ions may be measured to determine the number of molecules in the enclosure.

Although the grid 26 does not form a part of this invention, it is included to facilitate an understanding of the invention. The grid 26 operates to provide an electrical barrier against the flow of electrons between the electrodes 14 and 16 during the time that the difference in the voltages on the electrodes 14 and 16 is relatively low. Because of this, the electrons are able to move between the electrodes 14 and 16 only when the voltage difference between the electrodes is relatively great. This insures that the electrons strike molecules of gas with sufficient energy to ionize such molecules.

For example, during the time that the voltage on the electrode 16 is increasing and the voltage on the electrode 14 is decreasing, the grid 26 is instrumental in preventing the flow of electrons from the electrode 14 to the electrode 16 for voltages less than +240 volts on the electrode 16 and greater than +160 volts on the electrode 14 when the peak amplitude of the alternating voltage is 50 volts. The reason is that the voltage difference between the electrode 14 and the grid 26 is still sufficiently great to prevent the electrode 16 from attracting the electrons from the electrode 14.

As the voltage from the source 38 continues to increase, the voltage on the electrode 16 rises above +240 volts and the voltage on the electrode 14 falls below +160 volts. This causes the potential difference between the electrode 14 and the grid 26 to become relatively low so that the grid does not provide an electrical barrier against the movement of the electrons from the electrode 14 toward the electrode 16. At the same time, the voltage difference between the grid 26 and the electrode 16 becomes increased so that the electrode 16 produces an electrical field which is sufficiently strong to attract the electrons.

The poles 40 and 42 produce a force on the electrons to maintain a channeled flow of electrons between the electrodes 14 and 16. This results from the fact that the poles 40 and 42 produce a magnetic field in the axial direction common to the axis of the electrodes 14 and 16, the grid 26 and the enclosure 10. This magnetic field is sufficiently strong to prevent the electrons from deviating appreciably from the axial path during their movement between the electrodes 14 and 16. In this way, the poles 40 and 42 cause the electrons to pass through the openings 18 and 24 in the electrodes 14 and 16 without impinging against the walls of the electrodes. Since the electrons do not impinge against the walls of the electrodes 14 and 16, they cannot produce a secondary emission of electrons from the walls. This causes the electrons in the enclosure 10 to be produced entirely by the action of the electrons against the molecules of gas within the enclosure 10.

The electrons move in a reciprocal path between the electrodes 14 and 16 without impinging against the walls defining the enclosure 10. The reason is that the electrodes 14 and 16 receive a direct potential of +200 volts from the source 30. Actually, the electrons appear to be subjected to a potential in excess of +200 volts since they are attracted to the particular one of the electrodes 14 and 16 receiving a positive potential from the source 38.

Although the electrodes 14 and 16 are at a positive potential, the walls defining the enclosure 10 are at a suitable reference potential such as ground. The potential difference between the walls defining the enclosure 10 and the electrodes 14 and 16 is instrumental in inhibiting the movement of the electrons to the walls defining the enclosure 10. Furthermore, any electrons reaching the walls defining the enclosure 10 have a relatively low energy.

Although the discussion above has proceeded on the basis of the electrons within the electrodes 14 and 16, it will be appreciated that electrons also exist in the space outside of the electrodes 14 and 16. These electrons also move in a reciprocal path between the electrodes 14 and 16 in accordance with the introduction of the alternating voltage from the source 38. During their reciprocal movement, these electrons also tend to strike molecules of gas so as to produce further electrons and positive ions.

The embodiment of the invention shown in FIGURE 3 is similar to the embodiment shown in FIGURES 1 and 2 and described above except that the embodiment shown in FIGURE 3 includes a pair of grids 50 and 52. The grid 50 is disposed between the electrode 14 and the wall defining one face of the enclosure 10. The grid 52 is similarly disposed between the electrode 16 and the wall defining the opposite face of the enclosure 10. Each of the grids 50 and 52 is formed as a hollow annular ring and is preferably disposed in axial alignment with the electrodes 14 and 16 and the grid 26.

The grids 50 and 52 are connected to receive a potential such as −100 volts. Because of this negative voltage, the grids 50 and 52 operate to inhibit the movement of electrons from the walls defining the enclosure 10 toward the electrodes 14 and 16. These electrons may be secondarily emitted from the walls defining the enclosure 10 when positive ions strike the walls. The positive ions are, in turn, produced from the molecules of the gas within the enclosure 10 in a manner similar to that described above when the electrons travel in a reciprocal path between the electrodes 14 and 16.

Figure 3:
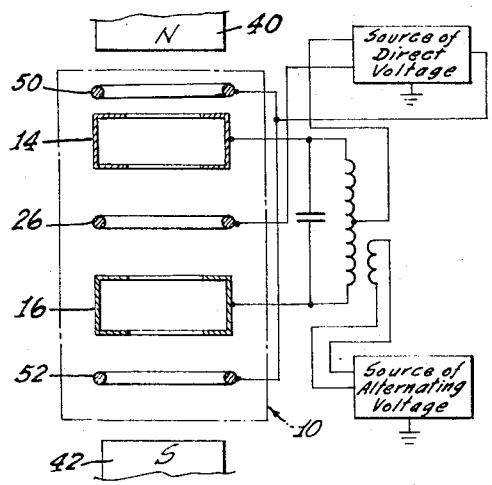
FIGURE 3 is a view, partly in section and partly in block form, schematically illustrating a second embodiment of the ionization gauge included in this invention.

The ionization gauges shown in FIGURES 1, 2 and 3 and described above have certain important advantages. One advantage results from the relatively long travel path of the electrons between the electrodes 14 and 16. A further advantage results from the relatively high level of energy imparted to the electrons during their movement between the electrodes 14 and 16. This relatively high level of energy is obtained because of the voltage difference produced between the electrodes 14 and 16 as a result of the alternating voltage from the source 38. The relatively long travel path of the electrons and the relatively high level of energy imparted to the electrons during their travel through such path are instrumental in obtaining the ionization of an optimum number of molecules by the electrons.

The ionization gauges shown in FIGURES 1, 2 and 3 and described above have certain other advantages of some importance. One further advantage results from the fact that the electrons used by the ionization gauges to produce further charged particles are obtained entirely from the molecules of the gas within the enclosure 10 rather than by secondary emission from the electrodes 14 and 16 or from the walls defining the enclosure 10. Since the ions and electrons are obtained entirely from the molecules of gas within the enclosure 10, the ionization gauges shown in FIGURES 1, 2 and 3 and described above constitute a pure source of ions and electrons.

Because the ionization gauges constitute a source of pure ions, there are no problems of erosion such as would occur if electrons were obtained by surface emission as from the walls defining the enclosure 10. Such erosion occurs in ionization gauges of the prior art since the surfaces of the electrodes and the walls defining the enclosure 10 suffer sputtering by the high energy ions of the different gases which are introduced into the enclosure 10. When appreciable erosion and sputtering with resulting surface contamination occur in the ionization gauges of the prior art, measurements thereafter obtained from such ionization gauges do not have great accuracy.

The erosion and contamination are also prevented in the ionization gauges shown in FIGURES 1, 2 and 3 and described above as a result of further advantages inherent in such gauges. For example, the ionization gauges shown in FIGURES 1, 2 and 3 and described above use no hot cathodes to produce electrons. Furthermore, the voltage difference between the electrodes 14 and 16 and the walls defining the enclosure 10 is relatively low. This prevents sparking and sputtering from occurring between the electrodes 14 and 16 and the walls defining the enclosure 10 even when a relatively large number of electrons are produced within the enclosure.

Figure 4:
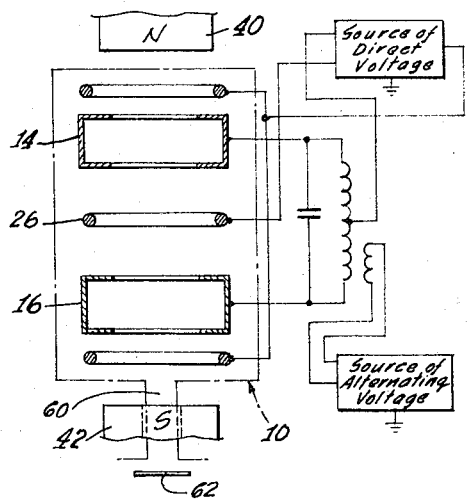
FIGURE 4 is a view, partly in section and partly in block form, schematically illustrating a third embodiment of the ionization gauge included in this invention.

The embodiment shown in FIGURE 4 is similar to the embodiment shown in FIGURE 3 except that the enclosure 10 is provided with an opening 60 in its bottom wall. By providing the opening 60 the positive ions produced by ionization of the molecules of gas are able to travel through the opening and to be collected by a plate 62. This causes the embodiment shown in FIGURE 4 to operate effectively as a vacuum pump in minimizing the number of molecules of gas within the enclosure 10. The embodiment shown in FIGURE 4 operates as a vacuum pump since the collection of ions by the plate 62 prevents molecules of gas within the enclosure 10 from being reformed so that only electrons and other negative particles eventually remain within the enclosure 10.

The embodiment shown in FIGURE 5 is somewhat similar to the embodiment shown in FIGURE 4 in that it includes the opening 60 in the bottom wall of the enclosure 10. However, a ring 70 is provided to replace the plate 62. The ring 70 is preferably provided with a hollow annular configuration so that the positive ions can pass through ring. The ring receives a suitable positive potential such as in the order of 5000 volts to repel the ions as the ions move through the ring. The repelling force produced on the ions is partially in a direction toward the center of the ring so that the ions effectively become focused as they move through the ring. The inclusion of the ring 70 and the production of a focusing action by the ring cause the embodiment shown in FIGURE 5 to operate as an ion source. In this way, the embodiment shown in FIGURE 5 is able to provide ions to apparatus (not shown) for use by such other apparatus.

The embodiment shown in FIGURE 6 includes a pair of electrodes 80 and 82 respectively corresponding to the electrodes 14 and 16 in FIGURES 1 and 2. Each of the electrodes 80 and 82 is provided with an annular configuration and is disposed in axially aligned relationship to the other electrode. Each of the electrodes 80 and 82 is provided with a frusto-conical configuration along its annular surface wherein the broad bases of the frusto-conical electrodes are disposed in adjacent relationship to each other. Openings 84 and 86 are disposed in the electrode 80 and openings 88 and 90 are disposed in the electrode 82.

Poles 92 and 94 are at opposite ends of the enclosure 10 in a manner similar to the poles 40 and 42 in the embodiments described above. However, each of the poles 90 and 92 is provided with a suitable configuration to provide a focusing action on the electrons moving in a reciprocal path between the electrodes 80 and 82. For example, each of the poles 92 and 94 may be provided with a hemispherical configuration respectively indicated at 96 and 98 for the poles 92 and 94.

Because of the configuration of the electrodes 80 and 82 and their pole faces 96 and 98, the electrons travel in arcuate paths indicated in broken lines at 100 in FIGURE 6. As will be seen, the broken lines 100 tend to become focused at each of the pole faces 96 and 98. The broken lines 100 tend to diverge from the axial line common to the electrodes 80 and 82 with progressive movements of the electrons toward a grid 102 corresponding to the grid 26 in the previous embodiments. By providing a focusing action on the electrons during each reciprocal movement of the electrons between the electrodes 80 and 82, the embodiment shown in FIGURE 6 is further instrumental in preventing electrons from drifting laterally toward the walls of the electrodes 80 and 82 during such reciprocal movements.

The embodiment shown in FIGURE 7 is similar to the embodiment shown in FIGURE 6 in that it produces a focusing action on the electrons during the movement of the electrons between a pair of electrodes. In the embodiment shown in FIGURE 7, a pair of electrodes 120 and 122 are disposed between a grid 124. Each of the electrodes 120 and 122 may be provided with a substantially semi-cylindrical configuration. Each of the electrodes 120 and 122 is provided with openings at opposite ends of the semi-cylinder defining the electrode. Each of the electrodes 120 and 122 is coupled electrically to the source 30 to receive a suitable direct potential such as +200 volts.

Magnetic poles 126 and 128 respectively having semi-cylindrical faces 130 and 132 are disposed at the opposite ends of the electrodes 120 and 122. Semi-cylindrical electrodes 134 and 136 are respectively disposed within the electrodes 120 and 122 in concentric relationship with the electrodes 120 and 122. The electrodes 134 and 136 are made from a wire mesh and are connected to reference potentials such as ground. The electrodes 134 and 136 are provided with openings at their opposite ends at positions corresponding to the openings in the electrodes 120 and 122.

When positive ions are produced from the molecules of gas within the enclosure 10 in FIGURE 7, the positive ions tend to be repelled in a radial direction toward the electrodes 134 and 136 because of the positive potentials on the electrodes 120 and 122. The ions move through the electrodes 134 and 136 because of the use of a wire mesh for the electrodes. The positive ions tend to be focused during their radial movement because of the concentric relationship of the electrodes 120 and 134 and the electrodes 122 and 136 and because of the finite circumferential lengths of these electrodes. The finite circumferential lengths result from the provision of openings at the opposite ends of each of the electrodes 120 and 122 and the electrodes 134 and 136.

Since the positive ions tend to become focused as they move radially through the electrodes 134 and 136 toward the axial line common to the electrodes, the positive ions are able to pass through axial openings 140 in an electrode 142. The electrode 142 is provided with a cylindrical configuration and is disposed electrically at a reference potential such as ground. By obtaining the passage of the positive ions through the axial openings 140 in the cylindrical electrode 142, the embodiment shown in FIGURE 7 is able to operate as a vacuum pump in a manner similar to the embodiment shown in FIGURE 4 or is able to operate as an ion source in a manner similar to the embodiment shown in FIGURE 5.

The embodiment shown in FIGURE 8 is somewhat similar to the embodiment shown in FIGURES 1, 2 and 3. However, in the embodiment shown in FIGURE 8, an electrode generally indicated at 150 is formed from a pair of plates 152 and 154 having a planar configuration. The plates 152 and 154 have a relatively great height to define between the plates an extended space having substantially no electrical field. The plates 152 and 154 are connected to receive a suitable potential such as +200 volts. A second electrode generally indicated at 156 is formed in a similar manner from a pair of spaced plates 158 and 160 having a planar configuration. By introducing an alternating voltage to the plates 152 and 154 in opposing phase relationship to the alternating voltage introduced to the plates 156 and 158, a reciprocal movement of electrons is obtained between the plates 152 and 154 and the plates 156 and 158 in a manner similar to that described above for the embodiments shown in FIGURES 1, 2 and 3.

In the embodiment shown in FIGURE 9, an electrode generally indicated at 160 is formed from a plurality of rods 162, 164, 166 and 168. The rods 162 and 164 are disposed in spaced relationship to define a first plane corresponding to that defined by the plate 152 in FIGURE 8. The rods 166 and 168 are disposed in spaced relationship to define a second plane corresponding to that defined by the plate 154 in FIGURE 8. The spacing between the rods 162 and 164 and the rods 166 and 168 in FIGURE 9 corresponds to the spacing between the plates 152 and 154 in FIGURE 8. By connecting the rods 162, 164, 166 and 168 to receive a suitable potential such as +200 volts, the space between the rods 162, 164, 166 and 168 is provided with substantially no electrical field in a manner similar to that produced between the plates 152 and 154 in FIGURE 8 and within the electrode 14 in FIGURES 1 and 2.

A second electrode generally indicated at 170 is formed in a manner similar to that described above for the electrode 160 and is disposed in spaced relationship to the electrode 160. A grid generally indicated at 172 is also formed from a pair of spaced rods 174 and 176 and is connected to receive a suitable potential such as +100 volts. The grid 172 is disposed between the electrodes 160 and 170 in a manner similar to the disposition of the grid 26 relative to the electrodes 14 and 16 in the embodiment shown in FIGURES 1 and 2. In this way, electrons are able to move in a reciprocal path between the electrodes 160 and 170 so as to produce charged particles from the molecules of gas during such reciprocal movement.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for obtaining a controlled production of charged particles, means including at least one wall defining a controlled space, means operatively coupled to the wall for obtaining the introduction of a plurality of molecules into the controlled space, control means disposed within the controlled space for obtaining a reciprocal movement of electrons through the controlled space to obtain the production of charged particles by the electrons during such movement, and means disposed within the controlled space and outside of the path of the reciprocal movement of the electrons for preventing any contact of the electrons against the space means including the wall.

2. In combination for obtaining a controlled production of charged particles, means including at least one wall defining a controlled space, means extending through to the wall for obtaining the introduction of a plurality of molecules into the controlled space, means disposed within the controlled space for obtaining a reciprocal movement of electrons through controlled paths in the controlled space to obtain the production of the charged particles from the molecules during such reciprocal movement of the electrons, and means disposed within the controlled space and operative upon the electrons for preventing the electrons from contacting the space means including the wall.

3. In combination for obtaining a controlled production of charged particles from a plurality of molecules, means defining a controlled space, first electrode means for defining a first control space, second electrode means for defining a second control space, the first and second means being disposed in spaced relationship to each other and being disposed within the controlled space to provide a movement of charged particles between the first and second electrode means, means for providing for the introduction of the plurality of molecules into the space between the first and second electrode means, means operatively coupled to the first and second electrode means for alternately applying potentials to the first and second electrode means to obtain a reciprocal movement of charged particles between the first and second electrode means and to obtain the production of further charged particles during such movement of the charged particles, and means displaced from the first and second electrode means and disposed within the controlled space for producing forces on the charged particles to prevent the charged particles from striking the first and second electrode means.

4. The combination set forth in claim 3 in which the first electrode means have a first opening in the first control space and in which the second electrode means have a second opening in the second control space and in which the first and second electrode means are disposed to obtain a reciprocal movement of the charged particles between the first and second electrode means through the first and second openings.

5. In combination for obtaining a controlled production of charged particles from a plurality of molecules, means defining a controlled space, a first electrode disposed within the controlled space and shaped to obtain a movement of charged particles in a particular direction toward and away from the electrode, a second electrode disposed within the controlled space and shaped to obtain a movement of charged particles in the particular direction toward and away from the electrode, the first and second electrodes being displaced from each other in the particular direction to provide for a movement of charged particles between the first and second electrodes, means for providing for the introduction of the plurality of molecules into the space in the first direction between the first and second electrodes, means operatively coupled to the first and second electrodes for producing on the charged particles a first force alternating at a particular frequency in first and second opposite directions to obtain a movement of charged particles between the first and second electrodes for the production of further charged particles during such movement, and means disposed within the controlled space and displaced from the first and second electrodes in the direction of movement of the charged particles between the first and second electrodes for producing on the charged particles a second force for controlling the movement of the charged particles between the first and second electrodes to inhibit contact between the charged particles and the first and second electrodes.

6. In combination for obtaining a controlled production of charged particles from a plurality of molecules, means defining a controlled space, first electrode means disposed within the controlled space for defining a first control space for retaining the charged particles; second electrode means disposed within the controlled space for defining a second control space for retaining the charged particles, the first electrode means and the second electrode means being disposed in spaced relationship to obtain a movement of charged particles between the electrode means, means for providing for the introduction of the plurality of molecules into the space between the first and second electrode means, means operatively coupled to the first and second electrode means for producing an alternating electrical field between the first and second electrode means to obtain an oscillatory movement of charged particles between the first and second electrode means and to obtain the production of further charged particles during such oscillatory movement of the charged particles, and means disposed within the controlled space and displaced from the first and second electrode means in the direction of movement of the charged particles between the first and second electrode means for producing a magnetic field between the first and second electrode means to channel the movement of charged particles between the first and second electrode means for inhibiting contact of such charged particles with the first and second electrode means.

7. In combination for obtaining a controlled production of charged particles from a plurality of molecules, a source of direct voltage, first means coupled electrically to the source of direct voltage and provided with an extended length in a first direction and constructed to provide a substantially uniform electric field among the extended length in the first direction, second means coupled electrically to the source of direct voltage and provided with an extended length in the first direction and constructed to provide a substantially uniform electric field along the extended length in the first direction, the second means being displaced in the first direction from the first means to obtain a movement of electrons in the first direction between the first and second means, means for obtaining the introduction of the plurality of molecules into the space in the first direction between the first and second means, and means coupled electrically to the first and second means to introduce alternating voltages to the first and second means with the phase of the alternating voltage introduced to the first means being displaced relative to the phase of the alternating voltage introduced to the second means to obtain a movement of electrons between the first and second means and to obtain the production of the charged particles from the molecules as a result of such movement.

8. The combination set forth in claim 7 in which means are displaced in the first direction from the first and second means to produce a magnetic field in the direction of movement of the electrons.

9. In combination for obtaining a controlled production of charged particles from a plurality of molecules, a first electrode constructed to retain charged particles for oscillatory movement within the electrode and for movement toward and away from the electrode, a second electrode constructed to retain charged particles for oscillatory movement within the electrode and for movement toward and away from the electrode, the first and second electrodes being constructed and displaced from each other in a first direction to provide for a movement of charged particles in the first direction between the electrodes, means for obtaining the introduction of the plurality of molecules in the space in the first direction between the first and second electrodes, and means operatively coupled to the first and second electrodes for obtaining a reciprocal movement of charged particles in a controlled path between the first and second electrodes to provide for a production of further charged particles during such movement.

10. The combination set forth in claim 9, including, an enclosure housing the first and second electrodes, and means disposed between the electrodes and the enclosure in the first direction for inhibiting the movement of charged particles between the enclosure and the electrodes.

11. In combination for obtaining a controlled production of charged particles from a plurality of molecules, an enclosure, means operatively coupled to the enclosure for obtaining the introduction of the plurality of molecules into the enclosure, first means displaced from the enclosure in a first direction for providing a reciprocal movement of the charged particles of a particular polarity within the enclosure in the first direction to obtain the production of further charged particles of the particular polarity and of an opposite polarity from the molecules during such reciprocal movement, second means displaced from the enclosure and the first means in the enclosure in the first direction for operating upon the charged particles during their reciprocal movement to maintain the charged particles in free space within the enclosure, and means extending from the enclosure at a position beyond the first means for collecting the charged particles of the opposite polarity to provide a vacuum pump.

12. In combination for obtaining a controlled production of charged particles from a plurality of molecules, an enclosure, means operatively coupled to the enclosure for obtaining the introduction of the plurality of molecules into the enclosure, first means disposed within the enclosure and displaced from each other in a first direction for producing a first force on the electrons within the enclosure to obtain a reciprocal movement of electrons within the enclosure in the first direction for the production by the electrons from the molecules of further electrons and positive charged particles, second means displaced from the enclosure in the first direction for producing a second force on the charged particles to channel the reciprocal movement of the electrons and inhibit the impingement of the electrons with the first means during the reciprocal movement of the electrons, and third means displaced from the first and second means and extending from the enclosure for collecting charged particles of a particular polarity.

13. The combination set forth in claim 12 in which the first means produces an electrostatic field and the second means produces an electromagnetic field and the third means collects charged particles of a positive polarity.

14. In combination for obtaining a controlled production of charged particles from a plurality of molecules, first electrode means defining a first enclosure and constructed to retain the charged particles within the enclosure and to provide a movement of the charged particles into and out of the first enclosure, second electrode means defining a second enclosure and constructed to retain the charged particles within the enclosure and to provide a movement of the charged particles into and out of the second enclosure, the first and second electrode means being provided with a configuration and being displaced from each other in a first direction to provide for a reciprocal movement of the charged particles in the first direction between the first and second electrode means in an arcuate path converging at positions beyond the first and second electrode means, means for providing for the introduction of the plurality of molecules into the space in the first direction between the first and second electrode means, means operatively coupled to the first and second electrode means for introducing alternating potentials to the first and second electrode means to produce an alternating electrical field between the first and second electrode means for the production of the reciprocal movement of the charged particles between the first and second electrode means and for the production of further charged particles from the molecules during such reciprocal movement, and means displaced from the first and second electrode means in the first direction and shaped to produce a magnetic field for channelizing the charged particles into such reciprocal movement.

15. In combination for obtaining a controlled production of charged particles from a plurality of molecules, a first electrode defining a first enclosure having a first opening for movement of charged particles into and out of the electrode, a second electrode defining a second enclosure having a second opening for movement of charged particles into and out of the second electrode, the first and second electrodes being displaced from each other in a first direction to obtain a reciprocal movement of the charged particles in the first direction between the first and second electrodes through the first and second openings in the electrodes, means for providing for the introduction of the plurality of molecules into the space in the first direction between the first and second electrodes, first means operatively coupled to the first and second electrodes for producing an alternating force on the first and second electrodes in a particular phase relationship to obtain the reciprocal movement of the charged particles in the first direction and to obtain the production of further charged particles during such reciprocal movement, and second means displaced from the first and second electrodes in the first direction for obtaining the withdrawal of charged particles from the electrodes in the first direction upon the production of such charged particles.

16. The combination set forth in claim 15 in which the first means are operatively coupled to the first and second electrodes to produce a reciprocal movement of electrons in the first direction and in which the second means are displaced from the first and second electrodes to produce a movement of charged particles of positive polarity in a direction transverse to the first direction.

17. The combination set forth in claim 15 in which the first means are operatively coupled to the first and second electrodes to produce a reciprocal movement of electrons in the first direction and in which the second means are displaced from the first and second electrodes to produce a movement of electrons in the first direction and in which means are displaced from the first and second electrodes to obtain a channeled flow of electrons by the first means and a channeled withdrawal of electrons by the second means without any contact between the electrons and the electrodes.

18. The combination set forth in claim 15 in which the first means are operatively coupled to the first and second electrodes to produce a reciprocal movement of electrons in the first direction and in which third means are provided to channel the movement of the electrons in the first direction for preventing the electrons from contacting the first and second electrodes and in which the second means includes a screen mesh displaced from the electrodes in a direction transverse to the first direction to provide for a movement of charged particles of positive polarity in the transverse direction and in which the second means is constructed to obtain a movement of the charged particles of positive polarity in the transverse direction.

19. The combination set forth in claim 1 wherein means are displaced from the controlled space in a particular direction to receive the positive ions produced from the molecules during the reciprocal movement of electrons through the controlled space.

20. The combination set forth in claim 3 wherein means are displaced from the first and second electrode means in a particular direction to provide for a movement from the space between the first and second electrode means of the positive ions produced from the plurality of molecules by the reciprocal movement of charged particles between the first and second electrode means.

21. The combination set forth in claim 8 wherein means are displaced in the first direction from the first and second means to provide for a movement of positive ions in the first direction beyond a particular one of the first and second means and to provide for a collection of the positive ions after such movement.

22. The combination set forth in claim 10 wherein means extend from the enclosure in the first direction to obtain a movement of positive ions from the enclosure in the first direction and to obtain a collection of such positive ions after the movement of the ions from the enclosure.

References Cited by the Examiner

UNITED STATES PATENTS

| | | | |
|---|---|---|---|
| 2,726,805 | 12/1955 | Lawrence et al. | 230—69 |
| 2,755,014 | 7/1956 | Westendorp et al. | 230—69 |
| 2,956,224 | 10/1960 | Heil | 324—33 |

JAMES W. LAWRENCE, *Primary Examiner.*

GEORGE N. WESTBY, *Examiner.*

V. LAFRANCHI, *Assistant Examiner.*